R. WIXSON.
Turning-Plow and Attachment.

No. 205,164.  Patented June 18, 1878.

Witnesses:
Jas. A. Harley.
W. R. Jenkins

Inventor:
Robert Wixson
per Jas. A. Harley.

UNITED STATES PATENT OFFICE.

ROBERT WIXSON, OF SPARTA, GEORGIA.

IMPROVEMENT IN TURNING-PLOW AND ATTACHMENT.

Specification forming part of Letters Patent No. 205,164, dated June 18, 1878; application filed January 29, 1877.

*To all whom it may concern:*

Be it known that I, ROBERT WIXSON, of Sparta, Georgia, have invented a Turning-Plow and Attachment, of which the following is a specification:

The plow, as shown by the accompanying drawings, is what is known as a "turning-shovel," the advantages of this particular plow being its shape and set, and the attachment by which the plow is securely fastened in such a position on the foot of the stock as to make the draft light, and at the same time accomplish the largest amount of effective work.

Figure 1:
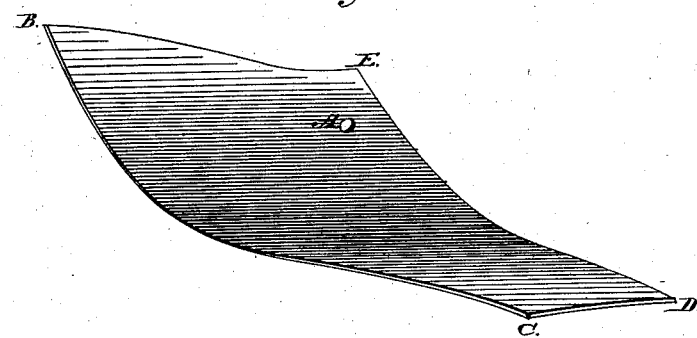

Figure 1 (B C D E) in annexed drawings represents the plowshare. A is the point at which the same is connected with the foot of the stock by a heel-pin passing through the attachment J G H I. The blade or share is formed, as shown in Fig. 1, with a straight or nearly straight land-side portion and a curved wing or mold-board portion, the front or cutting edge of the blade being curved transversely, so as to present a concave surface to the ground.

Figure 2:
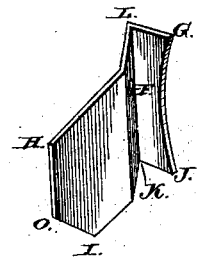

Fig. 2 (J G H I) represents the attachment, bent at the line K L. The attachment rests against the plow at J G, or on a line parallel to E D, beginning at a point between A and E and stopping at a point between A and D.

The line H O rests against the plow at a point between A and B and extends along the plow in the direction of the point C, the line I O resting parallel to the line B C at a part of the line opposite and nearest A. The point F is the place at which the heel-pin passes through the attachment, after which it passes through the foot of the stock and is secured by a tap or nut.

It is only necessary for the blade to rest against the attachment at the different points G J H I, for example, and not the whole length of the plate. Thus the manufacture and fitting of the parts together are rendered easy.

What I claim is—

1. The plowshare or blade, formed as shown, and having its front cutting-edge curved transversely, substantially as specified.

2. The share or blade, in combination with attachment-plate J G H I, all constructed and arranged to operate as described.

ROBERT WIXSON.

Witnesses:
 JAS. A. HADLEY,
 BEN. F. MARTIN.